No. 636,250. Patented Nov. 7, 1899.
N. H. FOOKS.
PROCESS OF PRESERVING BERRIES.
(Application filed June 15, 1899.)
(No Model.)
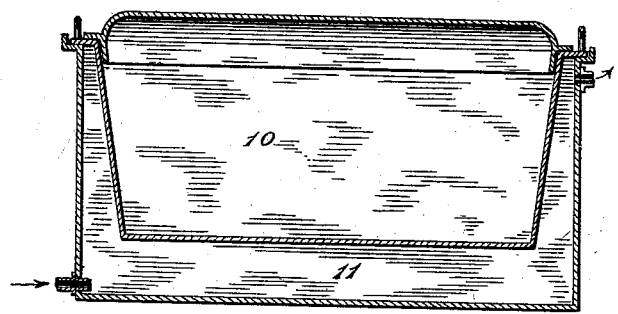
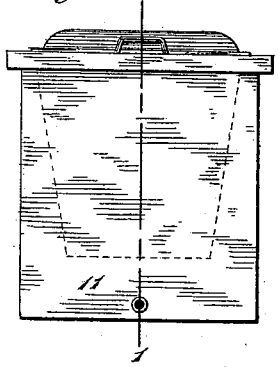
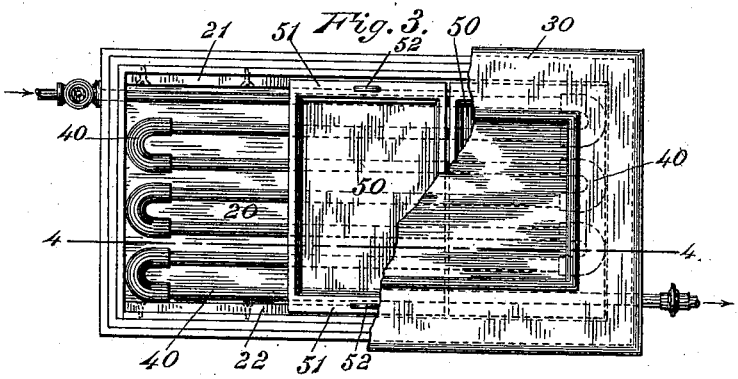
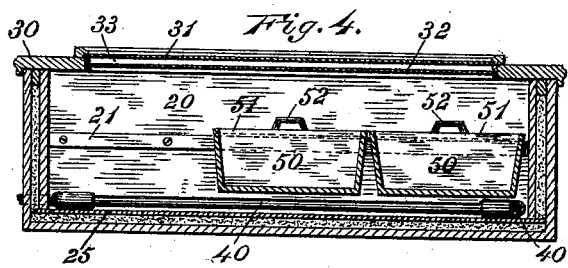
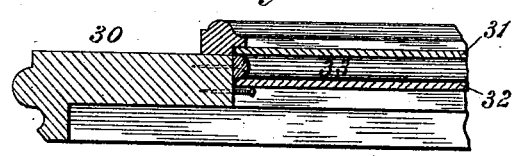
WITNESSES
Harry King
S. M. McColl
INVENTOR
N. H. Fooks
By F. C. Somes
Attorney

UNITED STATES PATENT OFFICE.

NELSON H. FOOKS, OF PRESTON, MARYLAND.

PROCESS OF PRESERVING BERRIES.

SPECIFICATION forming part of Letters Patent No. 636,250, dated November 7, 1899.

Application filed June 15, 1899. Serial No. 720,683. (No specimens.)

*To all whom it may concern:*

Be it known that I, NELSON HENRY FOOKS, a citizen of the United States of America, residing at Preston, in the county of Caroline, in the State of Maryland, have invented certain new and useful Improvements in Processes for Preserving Berries, of which the following is a specification.

The object of this invention is to preserve delicate berries, such as strawberries, so that the berries remain whole or uncrushed and retain to a great extent their natural appearance and flavor.

In the usual or ordinary method of preserving strawberries they are subjected to a simmering operation in a syrup for a considerable length of time and are finally subjected to a high heat for a comparatively short period. As usually prepared, preserved strawberries are much crushed and broken and are comparatively insipid. The crushing and breaking is probably due to the high boiling temperature to which they are subjected at the finishing step of the operation after they have become softened by long simmering.

This invention consists principally in first boiling the berries in the proper syrup at a high temperature for a comparatively short period of time—say from five to fifteen minutes, more or less—and then subjecting the mass of berries and syrup in comparatively thin layers to a slow cooking and evaporating operation without ebullition, whereby the syrup is reduced to the proper consistency and the berries preserved whole in a plump condition.

In the first step of the operation the berries are thoroughly heated through and cooked to a sufficient degree to kill any germs or living organisms before they have become softened by any prior treatment, and during the second step of the process, after they have become somewhat softened, they are cooked to a finish and the syrup is brought to the proper consistency without the aid of boiling or other agitation which would tend to break the berries.

Figure 1 of the accompanying drawings represents a longitudinal section of one form of boiling-kettle adapted for carrying out the first step of this process. Fig. 2 represents an end elevation thereof. Fig. 3 represents a top plan view of an apparatus for carrying out the second step of the process, a portion of the cover or lid thereof being broken off. Fig. 4 represents a longitudinal vertical section of said second-step apparatus on line 4 4 of Fig. 3. Fig. 5 represents an enlarged section of a portion of the cover of the second-step apparatus.

The same reference-numbers indicate corresponding parts in the different figures.

The apparatus for carrying out this process comprises means for cooking the berries at a comparatively high temperature and means for finishing the cooking operation and concentrating the syrup at a comparatively low temperature.

The means for cooking the berries in the first step may consist of any suitable apparatus, such as an ordinary boiling-kettle 10, provided with a steam-jacket 11, supplied with steam at high pressure. Instead of the steam-jacketed kettle any suitable kettle or device may be used for this purpose.

The means shown for carrying out the second step of the process consists of a chamber 20, having walls insulated to prevent the loss of heat and preferably provided with a detachable lid 30. A steam-coil 40 is disposed in this chamber, preferably at the bottom thereof, and connected with a suitable steam-generator. This chamber is provided on opposite sides with ledges 21 and 22. Pans 50 are disposed side by side in the chamber and are provided with flanges 51 at their upper edges, which engage the ledges on the sides of the chamber 20 and with handles 52. These pans are constructed of any suitable material—such as sheet metal, graniteware, or porcelain-lined ware—and constitute receptacles in which the berries in their syrup are exposed in comparatively thin layers to the action of the slow heat of the chamber. The cover or lid 30 is preferably provided with double transparent panes 31 and 32 of glass to facilitate the inspection of the berries for determining how the operation is progressing and when the berries are finished without raising the cover, the double panes forming a non-conducting air-space. This transparent pane also serves as an indicator of the condition of moisture in the chamber. When by the evaporation of the water from the syrup the air of the chamber becomes too moist, the moisture condenses on the inner face of the glass and indicates that ventilation is necessary. The lid may then be raised for a short period or ventilation otherwise effected.

In carrying out the process with the use of the apparatus described I take strawberries and sugar in the proportions of, say, sixty per cent., by weight, of berries to forty per cent., by weight, of sugar, or any other desired proportion. The sugar is first made into a syrup of a degree of consistency known as "thread" or thereabout. Then the berries are put into the syrup, preferably while the syrup is hot, and subjected to a boiling operation in the kettle 10 for a period of from five to thirty minutes, which may be effected by the heat of steam at high pressure or by the direct heat of fuel-combustion or in any other suitable way. After this cooking operation by boiling is completed the mass of syrup and berries is transferred to the comparatively shallow pans 50 within the evaporating-chamber 20. The steam in the coil 40 in this chamber imparts a comparatively moderate degree of heat, and the partially-cooked product remains in this chamber subject to the evaporating and cooking action of its temperature for a period of from three to five hours, more or less. By this step the syrup is concentrated by evaporation to the desired consistency of, say, about one-half, more or less, of its former bulk and the cooking of the berries is finished without breaking or crushing them. In fact, it is found that the berries appear more plump after the evaporating process than after the boiling operation, and they preserve their color, natural appearance, and flavor to a high degree.

I claim as my invention—

The process of preserving berries which consists in subjecting the berries in a suitable syrup to a cooking operation by boiling for a comparatively short period, and then subjecting the fruit-containing syrup in the form of a thin layer to the quiet slow cooking and evaporating action of heated air, avoiding ebullition, whereby the syrup is reduced to the proper consistence and the berries preserved whole in a plump condition.

NELSON H. FOOKS.

Witnesses:
F. C. SOMES,
S. M. McCOLL.